United States Patent [19]

Grant, Jr. et al.

[11] 4,317,089

[45] Feb. 23, 1982

[54] RING LASER

[75] Inventors: David C. Grant, Jr.; Thomas J. Hutchings, both of Thousand Oaks, Calif.

[73] Assignee: Litton Systems, Inc., Beverly Hills, Calif.

[21] Appl. No.: 214,143

[22] Filed: Dec. 8, 1980

Related U.S. Application Data

[63] Continuation of Ser. No. 947,355, Oct. 2, 1978.

[51] Int. Cl.$^3$ ............................................. H01S 3/083
[52] U.S. Cl. .................................... 372/94; 372/103; 372/107
[58] Field of Search .................... 331/94.5 C, 94.5 D; 356/350

[56] References Cited

U.S. PATENT DOCUMENTS 3,390,606  7/1968  Podgorski ........................... 356/350

Primary Examiner—William L. Sikes
Attorney, Agent, or Firm—Roy L. Brown

[57] ABSTRACT

A ring laser wherein, in the preferred embodiment, the laser path is substantially square, and the path length is adjustable by making at least one of the mirrors slightly tilted and one of the mirrors concave with at least the concave mirror translatable.

16 Claims, 8 Drawing Figures

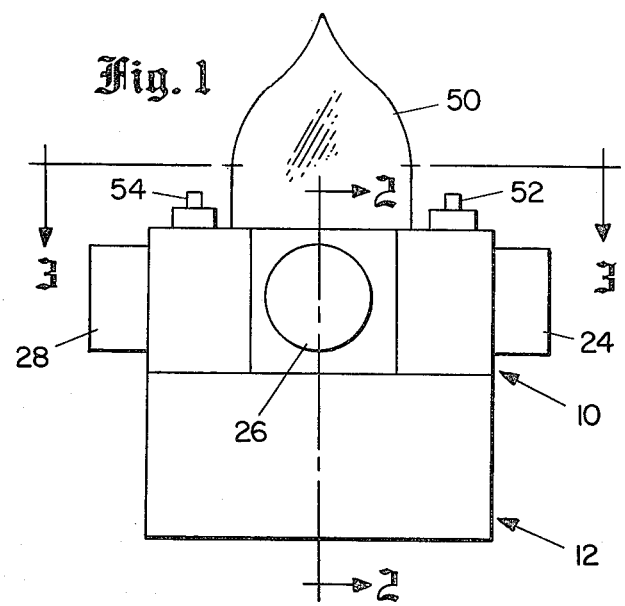
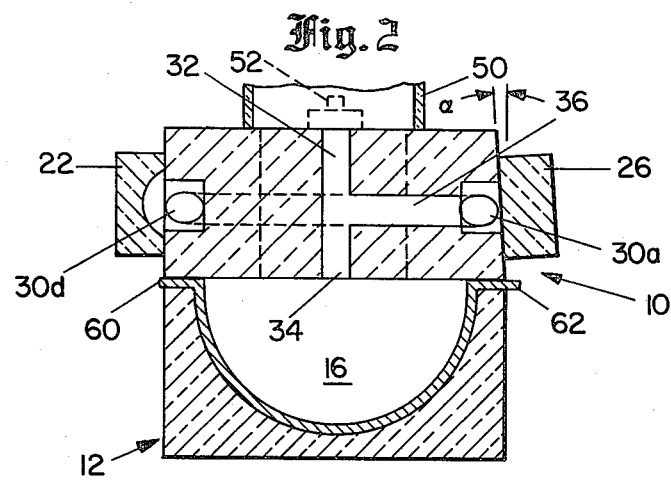
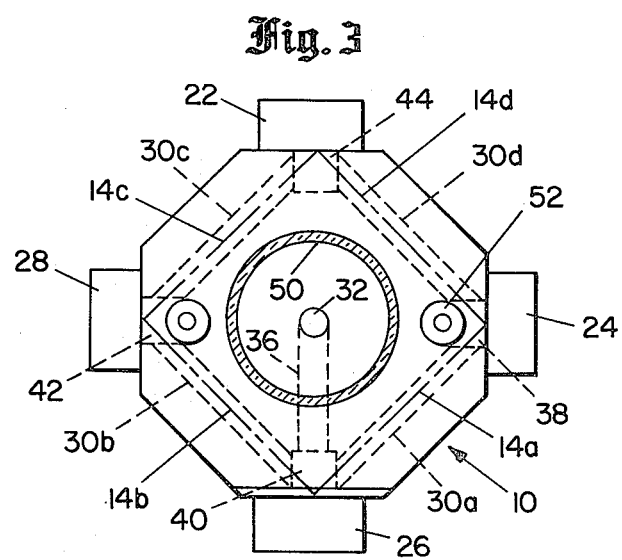

RING LASER

This is a continuation of application Ser. No. 947,355, filed Oct. 2, 1978.

BACKGROUND OF THE INVENTION

It is known to use a planar ring laser as a gyroscope.

Ring laser gyroscopes typically use a three or four sided laser path. The laser path usually occurs in a lasing chamber which is confined to bores formed in the general configuration of the laser path within a laser housing usually made of highly stable glass or ceramic.

The lasing mirrors are positioned where the laser chamber bores and laser path change direction. The bores extend from mirror to mirror, and the bores are sufficiently large to prevent vignetting of the laser light.

To excite the ring laser to cause two laser paths in opposite directions, it is customary to attach at least one cathode somewhere to the laser housing and to provide anodes on the laser housing together with conduits connecting the anodes and the cathodes into the laser bores in a geometric configuration whereby a motion of ions and electrons between the cathode and anodes excites the laser phenomenon.

Typically, the lasing gas within the bores is a helium-neon mixture at very low pressure. Application of a voltage of sufficient magnitude to ionize the gas between the cathode and anodes is applied to the cathode and to the anodes to cause a migration of electrons from the cathode to the anode and a migration of positive ions from the anodes to the cathode within the gain bores of the lasing gas, thereby exciting the lasing gas. The resonant cavity formed by said mirrors is tuned in frequency by adjusting the laser length for the particular lasing frequency desired. The regions of interaction between the gas and the electrons or ions are designated "gain regions".

It is usually desired that only the $TEM_{00}$, or on-axis mode of oscillation be present. To that end, one of the mirrors is apertured to suppress off-axis modes of oscillation in the laser path.

With two laser oscillations occurring at the same time, one with the light travelling in a first direction around the laser path and the other with the light travelling in the other direction around the laser path, it is well known that such a laser may be used as a gyroscope to detect the angular rotation of the laser housing about an axis perpendicular to the plane of the laser paths.

To tune the length of the laser path, it is customary to move one of the mirrors inwardly, perhaps by a screw mechanism or transducer, until the lasing amplitude peaks. The output of the laser, through a partially transmitting one of its mirrors, can be used to servo the position of the tuning mirror.

The laser beam is also typically focused by a large radius preferably spherical mirror to produce a laser beam of substantially uniform cross section. This feature is shown in FIG. 2-4 D of "The Laser" by William V. Smith and Peter P. Sorokin, McGraw-Hill, 1966.

BRIEF DESCRIPTION OF THE INVENTION

In its preferred embodiment the invention pertains to a modification of the laser by mounting a large radius concave mirror at the intersection of two branches of the laser path, and the tilting of a symmetrically positioned second mirror at a pyramid angle. Typically in a four sided laser path, it is the planar mirror opposite the concave mirror which is apertured and tilted. The tilted planar mirror and the concave mirror are moved up and down together until the proper lasing occurs. They are then fastened in place. The tilt is typically between one and three arc minutes, depending upon the wavelength of the laser light, the gain bore diameter and the lasing mode volume. One must be able to change the cavity length by at least a half wavelength without causing the mode volume to be affected by the gain bores in a way to cause a substantial loss in lasing gain. Tilting one of the mirrors to vary the length of the lasing path also causes the plane of the lasing path to be tilted upward through the same angle of tilt as the mirror. In a gyroscope the sensing axis needs to be perpendicular to the plane of the laser path. To create a laser usable as a gyroscope, the base of the gyroscope then also needs to be beveled through the same angle of tilt so that the mounting base is parallel to the plane of the lasing gases.

With the alignment improvement of this invention, the ring laser gyroscope may be made very small with the length of each side of the laser path substantially less than an inch in length. With such a small laser, the cathode of the laser is preferably the same order of size as the laser block itself. The cathode must be made large enough to produce an adequate amount of current within the gain bores of the lasing path to supply the required energy to the laser. A cathode block having a hemispherical cathode coated on the surface of a hemispherical bowl formed in the cathode block is typically attached to the bottom of the laser block. A passageway is made substantially from the center of the sphere defining the cathode surface upward into the laser block, thence directly outward to the laser ring. A pair of anodes are symmetrically positioned to cause the electron and ion path to split and travel in two directions through the gain bore portions of the laser path. The anodes are positioned out of the laser path, and a conduit is built into the laser block connecting the surface of the anodes with the laser path.

Application of a voltage between the cathode and anodes causes ionization of gas to occur within the cathode bowl and upward through the substantially vertical passage, thence outward to the laser paths, thence along the gain bores of the laser paths in different directions, thence to the surfaces of the anodes.

To align the laser with its sensing axis perpendicular to the plane of the laser path, the plane of the bottom of the cathode housing may be constructed parallel to the plane of the laser path for easy alignment of the gyro.

It is therefore an object of this invention to provide an improved optical resonator with a new tuning structure.

It is a more specific object of this invention to tune a ring laser.

It is a still more specific object of this invention to provide a ring laser which is configured to be used as a gyroscope.

Other objects will become apparent from the following description, taken in connection with the accompanying drawings.

BRIEF DESCRIPTION OF THE DRAWINGS

FIG. 1 is an outside view of a typical laser block and cathode block, attached together, showing the evacuation stem tipped off.

FIG. 2 is a sectional view, taken at 2—2 in FIG. 1.

FIG. 3 is a top view, taken at 3—3 in FIG. 1.

DETAILED DESCRIPTION OF THE INVENTION

Figure 4:
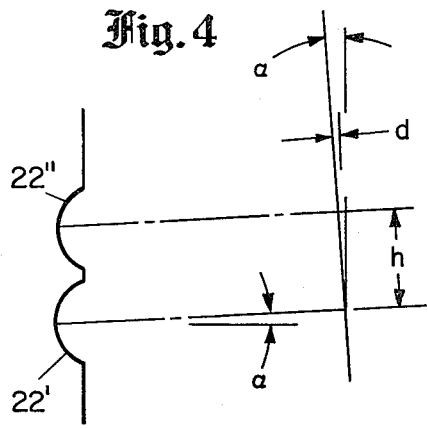
FIG. 4 is a schematic ray diagram showing a preferred embodiment of a concave mirror and its opposite planar mirror in the apparatus of FIG. 1.

The preferred embodiment of the ring laser of this invention which is used as a gyroscope is shown in the Figures. The ring laser has a laser block 10 and a cathode block 12, preferably made of a glass ceramic. Typical acceptable glass ceramics are known by the trademarks CERVIT, ZERODUR and ULE. These materials have a substantially zero expansion within a usable range of the laser. The laser block 10 carries the lasing path 14. The cathode block 12 carries the cathode 16, and the laser block 10 carries two anodes 52 and 54. Voltage between the cathode and anodes ionizes the lasing gas to deliver energy for lasing. No power supply for applying voltage between the anodes 52, 54 and cathode 16 is shown, but any typical DC power supply may be used, and the positive voltage is connected to the anodes 52 and 54 while the negative voltage is connected to the cathode 16. The laser block 10 and the cathode block 12 are held together both by atmospheric pressure and a sealant such as indium.

The preferred laser path 14 is a rectangular laser path, and more particularly a substantially square laser path as shown in the figures. The laser block is typically a square laser block, but unused portions of the block may optionally be cut off to minimize cost and fabrication difficulty so that the resulting block, as shown, is shaped as an octagon. Attached to four sides of the square laser block or to alternate nonadjacent sides of the octagonal laser block at the intersections of the laser branches are four mirror blocks 22, 24, 26 and 28 which have mirror surfaces on the interior thereof for reflecting the laser beam. At least one of the mirrors is partially transmissive to allow the laser beam to be emitted, at least one of the mirrors is apertured to prevent the production of unwanted modes of oscillation, and at least one of the mirrors 22 is concave with a suitable radius of curvature to focus the laser beam.

The lasing in the laser path occurs in a helium-neon gas mixture at a very low pressure of 3.2 Torr. The gas mixture, typically, is 20 parts helium to 1 part neon 20 and 1 part neon 22. To contain the lasing gas in the laser path, four substantially coplanar conduits 30a, b, c and d are bored in the laser block 10 connecting the mirrors. They are large enough in diameter to allow the plane of the laser beam to be translated and tilted through a small angle, typically on the order of 3 to 5 arc-minutes, without interference with the laser beam. The conduits could be tilted parallel to the laser beam.

Within the region whose perimeter is defined by the laser path, and preferably in the center of the laser block 10 is a conduit which is perpendicular to the plane of the conduits 30a, b, c and d. That conduit has two portions 32, leading to the top of the laser block 10, and 34 leading to the cavity formed by the cathode surface 16. The conduits 32 and 34 are connected with the conduits 30a, b, c and d by a conduit 36 which is typically substantially in the plane of the conduits 30a, b, c, and d.

In the regions of the mirrors 22, 24, 26 and 28 are four chambers 38, 40, 42 and 44 which are terminal regions for the branches 30a, b, c and d of the laser conduits and which are large enough to prevent interference with the laser light. Cavity 40 is connected by conduit 36 to the conduits 32 and 34.

The conduit 34 is preferably centered on the hemispherical cathode surface 16, but it is intended that this description shall cover the situation wherein the conduit 34 is not so centered. Further, although conduit 34 is shown perpendicular to the plane of the laser path 14a, b, c and d, it is intended that this description shall include slanting the conduit 34. The conduit 32 extends to the outer surface of the laser block 10 where it is surrounded by a glass or metal stem which is sealed to the laser block. It is further to be understood that the conduit 32 is for the purpose of evacuating the conduits, and its position in the center of the laser block is not critical. It is, however, convenient to form the conduits 32 and 34 colinearly by a single pass of an appropriate glass drill. It is further to be noted that conduit 32, although shown perpendicular to the path of laser path 14a, b, c and d may also be slanted, if desired.

The stem 50 is used to evacuate the system and to refill it with the required gas at a low pressure. When the stem 50 is metal, it may also be used as an anode. Note that the conduit 32 is connected through the conduit 34 to the region within the cathode surface 16 and through the conduit 36 to the laser conduits 30a, b, c and d. An exhaust pump (not shown) may be attached to the stem 50 to remove all air from the system. Further, a getter (not shown) may either be positioned within the stem 50 or within the region of conduits attached to stem 50 (not shown) adjacent the stem 50. After the system is evacuated the required lasing gas is filled into the system at a very low pressure, and the stem is tipped off to seal the system. The cathode block 12 is held onto the laser block 10 both by the resulting low pressure vacuum within the chamber formed by the cathode surface 16 and by a sealing material such as indium.

In the region of the compartments 38 and 42 are a pair of anodes 52 and 54 which are metallic conductors and extend from the outside of the laser block 10 inward into the chambers 38 and 42.

With a positive voltage connected to the anodes 52 and 54 and a negative voltage connected to the cathodes 16, electrons and ions commence to drift from cathode to anode and anode to cathode in the path defined by the chamber formed by the cathode 16, the conduits 34 and 36 into the compartment 40. At the compartment 40, the path splits, and a portion of the ion-electron drift is in one direction through a gain bore from the compartment 40 to the compartment 38 and thence to the anode 52. The other part of the drift is from the compartment 40 through the gain bore 30b to the compartment 42 and thence to the anode 54. The motion of the electrons and ions in two directions within the gain bores of the proposed laser path excites the gases therein to a higher energy state from which they drop to a lower energy state to produce light at the frequency to which the laser path is tuned. Thus, energy is provided to the laser from the source which is connected to the cathode 16 and anodes 52 and 54.

Typically the length of the laser cavity is tuned by making the curved and apertured mirrors movable. One of the two movable mirrors is tilted at a pyramid angle so that upward and downward movement of that mirror also moves the mirror inward and outward relative to the laser path to peak the laser signal.

In the preferred embodiment of this invention, however, the apertured mirror is tilted inward at a small pyramid angle, typically from 3 to 5 arc minutes, so that moving the concave mirror 22 in a direction normal to the conduits 30a, b, c and d and the apertured mirror 26 to keep the aperture opening in the laser path lengthens and shortens the laser path.

A pyramid angle between two planes is defined as 90° minus the dihedral angle between those planes. A dihedral angle is defined by the "Mathematics Dictionary" third edition by James and James, published by Van-Nostrand & Company. "The union of a line and two half-planes which have this line as a common edge. The line is the edge of the dihedral angle and the union of the line and one of the planes is a face. A plane angle of a dihedral angle is an angle formed by the two rays which are the intersections of the faces of the dihedral angle and a plane perpendicular to the edge. Any two plane angles are congruent. A measure of a dihedral angle is a measure of one of its plane angles." The dihedral angle between the tilted mirror and the plane defined by the conduits 30a, b, c and d and the two parallel planar mirrors on the mirror blocks 24 and 28 is slightly less than but almost 90°, differing from 90° by the pyramid angle of the plane of the tilted mirror which typically is very small. The pyramid angle is governed by the lasing wavelength, the gain bore diameter and the lasing mode volume. One must be able to change the cavity length by at least a half wavelength of the laser light without causing the mode volume to be affected by the gain bores in a way to cause a substantial loss in lasing gain. As the concave mirror is moved up and down, the laser path is also moved up and down, thereby striking a different portion of the tilted mirror, such portion forming a shorter or longer path for the laser beam. By striking a different portion of the tilted mirror, the on-axis beam would be extinguished by the aperture stop unless the tilted mirror is also moved to re-align the aperture opening with the laser beam.

If all of the planar mirrors 24, 26, and 28 had the planes of their mirrors perpendicular to the same plane defined by the plane of the conduits 30a, b, c and d, motion of the concave mirror 22 up and down would merely move the laser beam up and down without changing the length of the lasing path. However, with the mirror 26 having its planar surface tilted at a pyramid angle, the entire plane of the laser path is tilted upward through that small pyramid angle so that the plane of the incident and reflected laser rays on the tilted mirror is perpendicular to the surface of the mirror. This causes the intersection of the laser beam and the concave portion of the concave mirror 22 to move on that concave surface. If the concave surface is a spherical surface, the amount of displacement is determined by the radius of that concave mirror and the above-mentioned pyramid angle tilt of the planar mirror 26.

Alternatively, the block 22 carrying the concave mirror surface could merely have been tilted inward through the small pyramid angle whereby motion of the block 22 not up and down but tilted inward at the small pyramid angle would lengthen and shorten the laser path length and move the intersection of the laser path on the mirrors 24, 26 and 28. The mirror 26 would also need to be moved up and down to align the aperture opening with the new laser path. The conduits carrying the lasing path must be large enough to accommodate the variations in position described.

With the structure described, a very small laser gyro may be constructed. The sum of the lengths of the four sides 14a, b, c and d may have, for example, a nominal length of 6.8 centimeters.

The cathode surface 16 is typically made of aluminum, and indium may be connected to the aluminum and positioned at 60 and 62 so that negative voltage may be applied to the aluminum cathode 16.

The exhaust and fill stem 50 is typically made from a glass tube section which is flared at the bottom to accommodate a radio frequency fired getter. Alternatively, the exhaust and fill stem may be smaller than shown. It may also be made of metal, the exhaust and fill stem may be used as an anode.

The mounting faces of the octagonal laser block 10 are typically only one centimeter across, and the mirrors blocks 22, 24, 26 and 28 are typically 0.8 centimeters or smaller in diameter. The mirror surfaces themselves are typically 7.75 millimeters in diameter and have a typical thickness of 4 millimeters. The curved concave mirror surface of block 22 has a very long radius of curvature on the order of 60 centimeters. Mirror 26 is apertured to ensure that off-axis modes of operation are suppressed while allowing the on-axis $TEM_{00}$ mode to lase. Lasing can best take place when the aperture of the tilted mirror 26 is aligned so that the ray which is normal to the outer of the aperture on the mirror 26 is also on a radius of the curved mirror 22. The mirror blocks 22, 24, 26 and 28 as well as cathode block 12 are typically sealed with indium-gold metal seals. The body of the laser block 10 is of glass ceramic material which has an extremely low, and preferably zero, coefficient of expansion over the range of temperatures desired.

The reflectivity of the mirror coating is typically on the order of 99.94%. Transmission is typically less than 0.1% and the scattering losses are typically on the order of 100 parts per million. A typical minimum lasing threshold anode-cathode current is on the order of $\frac{1}{2}$ to $2\frac{1}{2}$ milliamperes. Tuning is accomplished by moving the mirror blocks 22 and 26. Then, after the laser is tuned the positions of the mirror blocks are measured, the mirrors and wax are removed, and the mirror blocks are accurately soldered in place by indium-gold solder seals.

The resonance frequency is an optical frequency which typically is on the order of $10^{14}$ Hz. In normal use it is desired that the resonance frequency of the cavity be tuned to the center of the gain curve, or as near as possible to the center, to a fraction of the wavelength. In FIGS. 4, 5, 6, 7 and 8 the pyramid angle is designated by the symbol $\alpha$. In FIG. 6, two laser paths are shown, one defined by the numerals 14a, b, c and d and the other defined by the numerals 14e, f, g, and h. The laser path length is nominally a square, but movement of the laser path down varies the path length from that shown by 14a, b, c and d to that shown by the longer path 14e, f, g and h. The relation between the mirror motion and the path length is shown more graphically in FIG. 7. Two restraints apply: first, the lasing beam must not be vignetted by the laser bores 30a, b, c and d, and second, the beam must be within the aperture of the mirror on the mirror block 26. A vertical projection of FIG. 6 is shown in FIG. 4.

To a first approximation if we are to change the cavity length by a distance equal to a wavelength, then a displacement h (FIG. 4) effectively translates the aperture of the tilted mirror 26 inward a distance $d = h \tan \alpha$. The desired motion in the directions shown in FIG. 7 by the "s", is on the order of $\frac{1}{2}$ of a wavelength of the lasing light. From FIG. 7 it is seen that $s = 0.707d$ (a square lasing path is assumed), and d = the wavelength divided by 1.414 which is equal to $6.33 \times 10^{-5}$ centimeters.

The lasing beam diameter, $d_B$ is less than or equal to 0.089 centimeters while the bores 30a, b, c, and d are typically of a diameter $d_g$ at least equal to 0.1778 centimeters. The total allowable motion for d, $\Delta d$ is 0.0880 centimeters where $h = \pm 0.0440$ centimeters. From this, the angle $\alpha$ may be calculated as the ratio of d to h or $1.017 \times 10^{-3}$ radians which is about 3.49 arc minutes.

Figure 5:
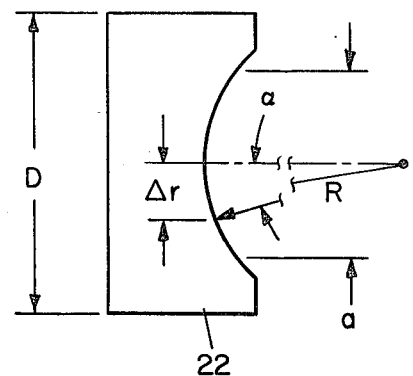
FIG. 5 is a schematic diagram showing the relation of the curvature of the concave mirror to the displacement of the lasing plane.
Figure 6:
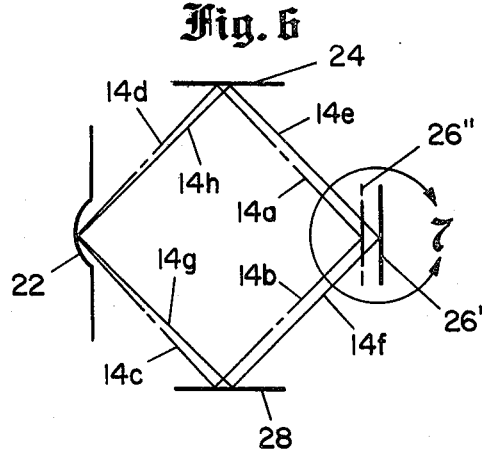
FIG. 6 is a schematic ray diagram showing the displacement of the laser rays with displacement of the concave and the tilted planar mirror.
Figure 7:
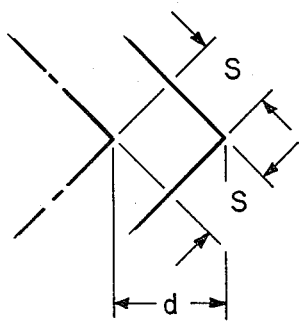
FIG. 7 is an enlarged schematic view taken at 7 in FIG. 6.
Figure 8:
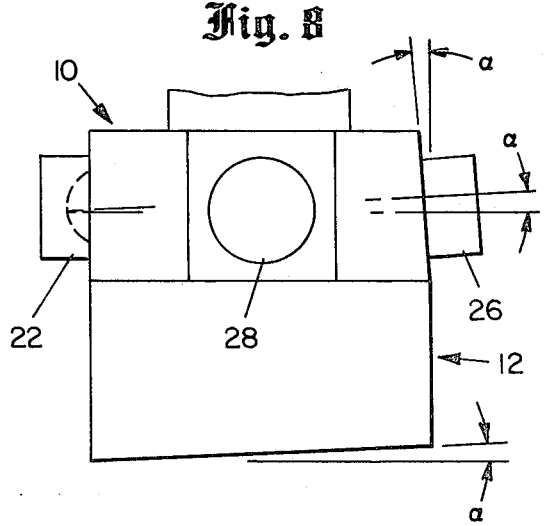
FIG. 8 shows the angling of the base of the cathode block into a contour parallel with the laser plane for use as a ring laser gyroscope.

In FIG. 5 the curvature of the surface has been exaggerated, and the radius R is out of proportion. The radius of the concave mirror on block 22 is shown very short, but in actuality it is on the order of 60 centimeters. The beam position on the curved mirror face from dead center wherein $\alpha$ equals zero to a point $\Delta r$ from the center, $\Delta r = aR = (1.017 \times 10^{-3})(60) = 0.061$ centimeters. The beam radius is 0.0898 centimeters divided by 2 or 0.0449 centimeters. With the beam displaced a distance $\Delta r = 0.061$ centimeters, the edge of the beam lies at a distance of 0.1059 centimeters from the center of the curved mirror. The curved mirror typically has an aperture on the order of 0.4 centimeters in diameter or 0.2 centimeters in radius. Thus, a margin of $0.2 - 0.11 = 0.09$ centimeters is provided. This sets the limit on the amount of allowed increase in the angle $\alpha$ to $0.09/60 = 1.5 \times 10^{-3}$ radians, the allowable shift of the lasing beam on the face of the curved mirror 22. Further, the bores 30abcd limit the amount by which the mirrors can be shifted. When mirror 36 is tilted, the plane of the lasing path also tilts through an angle $\alpha$, and the base of the cathode block 12, as shown in FIG. 8 needs to be tilted through that same angle so that the base is parallel to the lasing plane. The base of the cathode block 12 may then be attached into, for example, a guidance system with the knowledge that the angular measure determined from information contributed by the ring laser is an angle and angular rate measured both perpendicular to the laser path and to the mounting face.

Although a square laser path has been shown, it is obvious that the principles set forth herein may be used with other rectangular and quadrilateral paths. It is intended that the concepts of this invention should be applied to such paths by tilting at least one of the mirrors at a pyramid angle.

It is also apparent that a three sided laser path may be used or, alternatively, a multi-sided laser path having more than four branches may be used with at least one of the mirrors having a small pyramid angle so that sliding of the concave mirror shortens or lengthens the laser path, and with the aperture on the concave mirror.

It is also apparent that the apparatus and methods of this invention can be used to tune other optical resonators by tilting one of the resonator mirrors so that movement of the tilted mirror in the direction of tilt shortens or lengthens the resonator path length.

It is intended that the coverage shall include tuning of straight as well as nonstraight optical resonator paths.

It shall also cover the tuning not only of active resonators but of passive resonators as well.

Further, it shall not matter if the optical resonator is stable or nonstable.

The invention has been described in detail above, and a specific embodiment has been given. It is not intended, however, that the invention shall be limited by that description, but only by that description taken together with the descriptive matter in the appended claims.

We claim:

1. A ring laser, including means forming a resonant cavity, an active gaseous medium within said cavity, a pumping source, and energy abstracting means, comprising:

a block defining said resonant cavity in a closed path containing said active gaseous medium, including at least one laser gain region within said cavity, said means forming a resonant cavity including a plurality of mirrors positioned within said gaseous medium in said cavity, a cathode and at least two anodes connected by passageways formed in said block through said gain regions of said cavity, the passageways between said cathode and said anodes including said gain regions;

at least one of said mirrors being concave, and the remaining mirrors being substantially planar;

at least one of said mirrors being tilted at a pyramid angle relative to the other said mirrors; and at least one of said mirrors being partly transmissive.

2. Apparatus as recited in claim 1 in which at least one of said tilted mirrors has an aperture for suppressing unwanted modes of oscillation.

3. Apparatus as recited in claim 2 in which said mirrors are four in number, said concave mirror being mounted upon a surface which is tilted at a pyramid angle relative to planes normal to said planar mirrors whereby the position of said tilted mirror defines the lasing path.

4. Apparatus are recited in claim 3 in which said concave mirror is apertured to suppress unwanted modes of oscillation.

5. Apparatus as recited in claim 3 in which two of said planar mirrors are substantially parallel to each other, and one of said planar mirrors is apertured to suppress unwanted modes of oscillation.

6. Apparatus as recited in claim 1 in which at least one of said concave mirrors is slideably mounted upon a surface tilted at a pyramid angle relative to the other said mirrors.

7. Apparatus as recited in claim 6 in which at least one of said concave mirrors is apertured to suppress unwanted modes of oscillation.

8. Apparatus as recited in claim 1 in which said mirrors are positioned and configured such that laser beams reflected by said mirrors are substantially coplanar and one of said planar mirrors is mounted upon a surface which is tilted at a pyramid angle relative to the other said mirrors, at least said tilted mirror being apertured to suppress unwanted modes of oscillation.

9. Apparatus as recited in claim 8 in which said mirrors include two nonadjacent substantially planar parallel mirrors, a concave mirror, and a third planar mirror which is tilted at a pyramid angle relative to the other said mirrors.

10. Apparatus as recited in claim 9 in which said mirrors are positioned and configured to support a substantially rectangular laser path;

in which said cathode is attached to said block;

said anodes being a pair of anodes each positioned adjacent a different one of said two nonadjacent planar parallel mirrors;

said passageways formed in said block between said cathode and said anodes extending from said cathode, thence to the region of said tilted mirror, thence in two opposite directions through said gain regions of said lasing path into the regions of said parallel mirrors and said anodes.

11. In an optical resonator having means forming a resonant cavity, active gaseous media within said cavity, a pumping source, and an energy abstracting means, said means forming a resonant cavity including at least three mirrors with one said mirror being concave and the others planar, the improvement comprising support means for supporting said conave mirror at a tilted pyramid angle with respect to a plane defined by the other said mirrors.

12. Apparatus as recited in claim 11 in which the improvement further comprises a guiding surface on said support means at said pyramid angle relative to said defined plane for each said tilted mirror for guiding the positioning of its said tilted mirror.

13. A method for adjusting the laser path length of a ring laser, said ring laser having at least a resonant cavity defined by a plurality of mirrors, active gaseous media within said cavity, a pumping source, and energy abstracting means, including a first block with said resonant cavity therein for containing said gaseous media and having sufficient volume to allow formation of a multisided ring laser beam within said gaseous medium, a cathode and two anodes connected by gas-containing passageways to said resonant cavity, the path between said cathode and anodes including two gain regions of said cavity and configured to cause electrical discharge in opposing directions in said gain regions, at least one of said mirrors being concave and apertured to suppress unwanted modes of oscillation, and the remaining said mirrors being substantially planar with at least one of said concave mirrors being mounted to slide upon a surface which is tilted at a pyramid angle relative to the other said mirrors comprising:

translating at least one said concave mirror on said surface in a direction substantially perpendicular to the optical axis of said resonant cavity while maintaining said pyramid angle constant to tune said resonant cavity.

14. A method for adjusting the laser path lengths of a ring laser, said ring laser having at least a resonant cavity, active gaseous media, a pumping source, and energy abstracting means, including a first block with four conduits therein for containing a ring laser beam, a gaseous laser gain medium within said conduits, said resonant cavity being defined by at least four mirrors positioned and configured to produce said ring laser beam in said conduits, a cathode and two anodes connected by passageways to said conduits, the path between said cathode and anodes including gain regions of said conduits in opposing directions of supportable laser beams, one of said mirrors being concave, and the remaining mirrors being substantially planar with the planar mirror nonadjacent said concave mirror being mounted upon a surface which is tilted at a pyramid angle relative to the other said mirrors and having an aperture to suppress unwanted modes of oscillation comprising:

translating said concave mirror to tune any produced laser beam;

translating said tilted mirror along said surface in a direction substantially perpendicular to the optical axis of said resonant cavity while maintaining said pyramid angle constant to tune said resonant cavity and to align said aperture to suppress unwanted modes of oscillation.

15. A method for adjusting the length of an optical resonator having a resonant cavity, and energy abstracting means, including at least two mirrors with one said mirror being concave, and tilted support means for supporting said concave mirror at a tilt through a pyramid angle with respect to the other said mirror, comprising:

translating said tilted concave mirror on said surface in the direction of tilt relative to any produced laser beam while maintaining said pyramid angle constant to tune said resonant cavity.

16. A method for adjusting the length of an optical resonator having a resonant cavity, and energy abstracting means including at least two mirrors with at least one said mirror being concave and the remaining mirrors planar, and support means including a supporting surface tilted through a pyramid angle with respect to the other said mirrors for supporting one of said planar mirrors at a tilt, said tilted mirror being apertured to suppress unwanted modes of oscillation comprising:

translating said apertured mirror on said surface in the direction of said tilt and translating said concave mirror to track said aperture to suppress unwanted modes of oscillation and to tune the length of said resonant cavity.

* * * * *